United States Patent [19]
Miyano

[11] Patent Number: 5,582,237
[45] Date of Patent: Dec. 10, 1996

[54] APPARATUS FOR PREVENTING THERMAL DEFORMATION OF A MACHINE TOOL

[76] Inventor: Toshiharu Miyano, 50 Dundee La., Barrington Hills, Ill. 60010

[21] Appl. No.: 179,629

[22] Filed: Jan. 11, 1994

[51] Int. Cl.$^6$ .............................. F25B 29/00; B23Q 11/14
[52] U.S. Cl. ................... 165/46; 165/47; 165/300; 165/296; 165/259; 82/900; 83/170; 62/DIG. 10; 219/201
[58] Field of Search ................ 165/46, 47, 40, 165/39, 34, 26; 62/201, DIG. 10, 435; 83/170; 219/201; 82/900

[56] References Cited

U.S. PATENT DOCUMENTS

| | | | |
|---|---|---|---|
| 2,566,865 | 9/1951 | Wingerter | 62/201 |
| 2,725,218 | 11/1955 | Cuming | 165/47 |
| 3,186,275 | 6/1965 | Obenshain | 83/170 |
| 3,698,514 | 10/1972 | Buck et al. | 165/47 |
| 4,375,785 | 3/1983 | Schoch et al. | 62/DIG. 10 |
| 4,628,989 | 12/1986 | Parker et al. | 165/46 |
| 4,719,830 | 1/1988 | Kawada et al. | 165/47 |
| 4,850,201 | 7/1989 | Oswalt et al. | 62/201 |
| 5,197,537 | 3/1993 | Chigira et al. | 62/201 |

FOREIGN PATENT DOCUMENTS

| | | | |
|---|---|---|---|
| 1494151 | 9/1967 | France | 165/46 |
| 0259711 | 12/1985 | Japan | 165/47 |
| 0006311 | 1/1987 | Japan | 62/435 |
| WO92/01533 | 2/1992 | WIPO | 165/47 |

*Primary Examiner*—John K. Ford
*Attorney, Agent, or Firm*—Burns, Doane, Swecker & Mathis LLP

[57] ABSTRACT

An apparatus for preventing thermal deformation of a machine tool has a feed unit which heats a heat transfer fluid and pumps it out to a heat exchanging portion. The heat exchanging portion has at least one heat exchanging unit capable of being expanded and shrunk in accordance with the heat transfer fluid therein. The heat exchanging unit is arranged in a prescribed portion of a machine tool. The portion of the machine tool is heated by the heat exchanging unit arranged therein, whereby thermal distribution of the machine tool is equalized and heat deformation thereof is suppressed. The heat transfer fluid passed through the heat exchanging unit is recovered by a discharging portion and fed back to the feed unit. The heat exchanging unit is maintained in an expanded state by controlling the flow rate of the fluid passing therethrough by a flow control valve, so that heat exchanging operation can be carried out effectively. The heat exchanging unit in a shrunk state can easily be arranged even in a narrow portion of the machine tool.

30 Claims, 5 Drawing Sheets

APPARATUS FOR PREVENTING THERMAL DEFORMATION OF A MACHINE TOOL

BACKGROUND OF THE INVENTION

1. Field of the Invention

The present invention relates to an apparatus for preventing thermal deformation of a machine tool, which comprises heat exchanging portions designed to dispose in prescribed portions of the machine tool in order to prevent thermal deformation of these portions.

2. Prior Art Description

In machine tools, the electrical energy for driving thereof is inevitably consumed in part in the form of heat, so that machine tools suffer from thermal deformation. Since the thermal expansion rate of steel is as large as about 0.01 mm per meter by elevating one degree of Centigrade, thermal deformation occurred in a machine tool causes to deteriorate machining accuracy thereof. Thus, a conventional machine tool is provided with oil jackets placed around the bearing mechanism of a spindle and the like. A coolant such as a cutting oil is circulated through the oil jackets to prevent the machine tool from excessive heating, whereby the machine tool is adjusted of its thermal balance and is suppressed of its thermal deformation.

However, the provision of the oil jackets causes the machine tool complicated in structure. Further, there is a fear that the inner portions of the oil jackets will rust due to the coolant flowing therethrough. Furthermore, the portions of the machine tool which are cooled by the coolant are limited to the places where the oil jackets are provided, so that in the case that the thermal balance is changed owing to the atmosphere in which the machine tool is placed, the portions to be cooled cannot easily be modified in order to effectively suppress the thermal deformation occurred in the machine tool.

Accordingly, an object of the present invention is to provide an apparatus for preventing thermal deformation occurred in a machine tool, which is capable of suppressing the thermal deformation of the machine tool without causing the machine tool to be complicated in structure.

An another object of the present invention is to provide an apparatus for preventing thermal deformation occurred in a machine tool, which has one or more heat exchanging portions which can easily be attached on desired portions of the machine tool.

Still another object of the present invention is to provide an apparatus for preventing thermal deformation occurred in a machine tool, which is capable of heating and/or cooling desired portions of the machine tool.

Yet another object of the present invention is to provide an apparatus for preventing thermal deformation of a machine tool which is capable of performing suitable heating and/or cooling operations of the desired portions of the machine tool in accordance with an amount of heat transfer to the respective portions of the machine tool by a heat transfer fluid.

SUMMARY OF THE INVENTION

In order to achieve the above and other objects, according to the present invention, an apparatus for preventing heat deformation of a machine tool is provided, which comprises a feed means which has a heating means for heating a heat transfer fluid and a pumping out means for pumping out said heat transfer fluid heated by said heating means, a heat exchanging means which is supplied with said heat transfer fluid from said feed means via a piping means and heats a portion of said machine tool where said heat exchanging means is to be arranged, a discharging means for discharging said heat transfer fluid passed through said heat exchanging means, and a flow control means for controlling a flow rate of said heat transfer fluid passing through said heat exchanging means, wherein said heat exchanging means is capable of being expanded and shrunk in accordance with an amount of said heat transfer fluid therein.

In a preferred embodiment of the present invention, the heat exchanging means has at least one heat exchanging unit which is bag-shaped and made of flexible material so that it is capable of being expanded and shrunk in accordance with the heat transfer fluid therein. It is preferable that the heat exchanging means is releasably connected between the feed means and the discharging means by means of joint means. Usually, the heat exchanging means has a plurality of the heat exchanging units. These heat exchanging units can be connected in serial or in parallel. It is also preferable that the discharging means is connected to the feed means so that the heat transfer fluid passed through the heat exchanging means is fed back to the feed means.

In an another preferred embodiment, a control means is provided, which detects a temperature of the heat transfer fluid when flowing into and discharging from the heat exchanging means and controls the heating means to heat the heat transfer fluid based on detected temperature of the heat transfer fluid. A cooling means for cooling the heat transfer fluid may be provided, together with the heating means. In this case, the control means is designed so that it controls to drive the heating means and the cooling means selectively based on the detected temperature of the heat transfer fluid.

In operation, the heat exchanging means is arranged in a portion of thermally lower side of the machine tool, and the heat transfer fluid is supplied to the heat exchanging means from the feed means. The portion of the machine tool where the heat exchanging means is arranged is heated by the heat transfer fluid flowing through the heat exchanging means. As a result, each portion of the machine tool becomes thermally equalized, whereby thermal deformation of the machine tool can be suppressed.

The heat exchanging means according to the present invention is capable of being expanded and shrunk according to the amount of fluid contained therein. Therefore, the heat exchanging means is set in a shrunk condition and is arranged in the portion of the machine tool. The heat exchanging means arranged in the machine tool is expanded by supplying the fluid from the feed means via the flow control means. As a result, the expanded heat exchanging means is placed in the prescribed portion of the machine tool in such a manner that the outer surface thereof is fixedly contacted with the inner surface of the portion.

Therefore, according to the present invention, the heat exchanging means can easily be placed even in a narrow portion of the machine tool. The portion of the machine tool where the heat exchanging means is to be placed can easily be changed according to the thermal condition of the machine tool. In addition, the heat transfer from the heat transfer fluid passing through the heat exchanging means to the portion of the machine tool can be carried out effectively. Further, it is not required to provide a heat exchanging mechanism such as an oil jacket in the machine tool, so that the structure of the machine tool can be simplified. Furthermore, since the machine tool is not directly contacted with the heat transfer fluid, it is prevented from rusting.

The above and other objects and advantages are apparent from reading the following description with reference to the attached drawings.

DETAILED DESCRIPTION OF PREFERRED EMBODIMENTS

While the present invention will be described with reference to preferred embodiments, it is not intended to limit the present invention to these embodiments. On the contrary, it is intended to cover all alternatives and modifications thereof within the scope or spirit of the present invention as defined by the attached claims.

First Example

Figure 1:
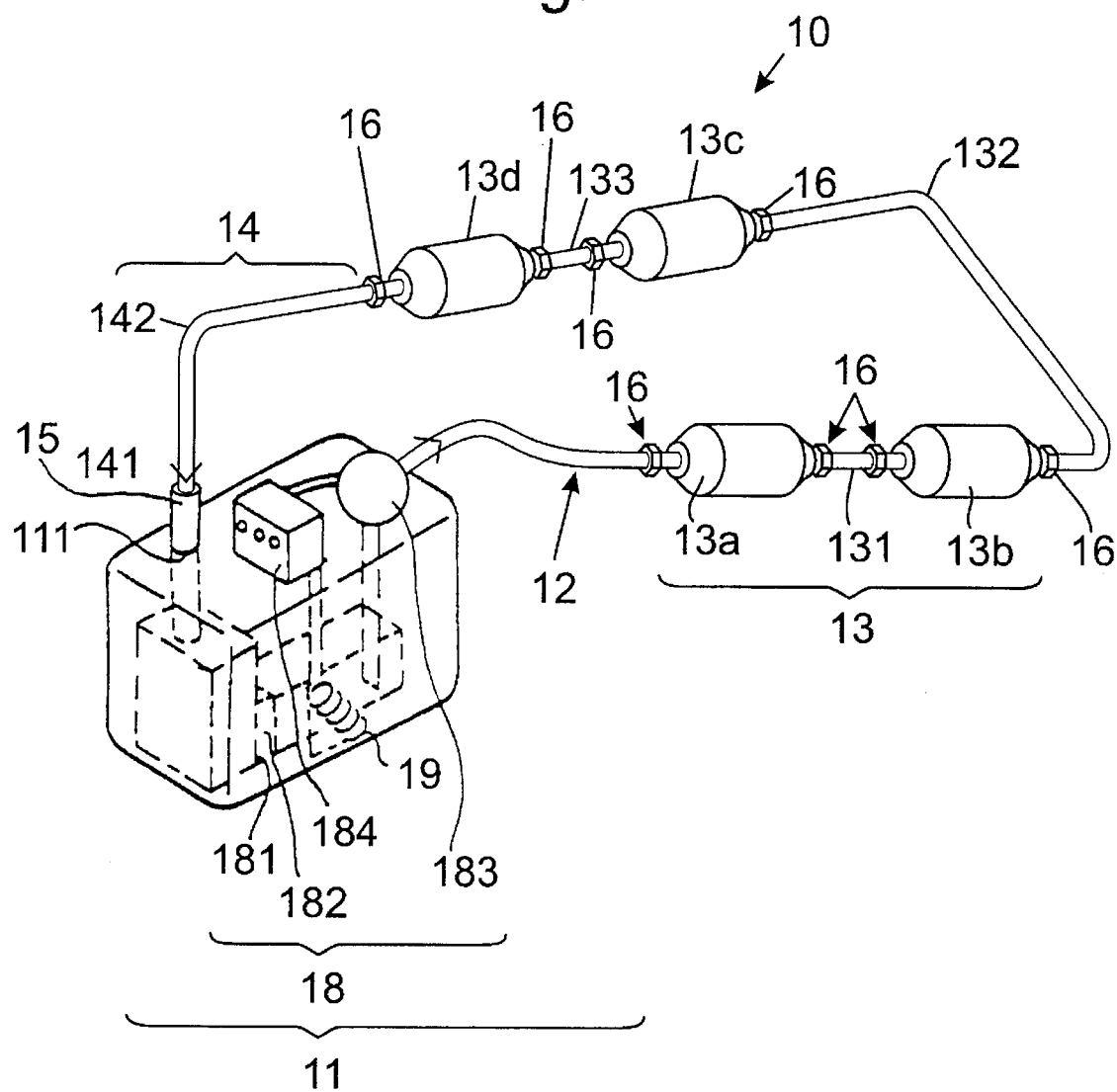
FIG. 1 illustrates schematically the constitution of a first example of the apparatus according to the present invention.

Referring now to FIG. 1, a first example of an apparatus according to the present invention will be described. As shown in this figure, an apparatus 10 for preventing thermal deformation of a machine tool has a feed unit 11 for feeding a cooled or heated oil, and a heat exchanging portion 13 having four heat exchanging units 13a, 13b, 13c and 13d which is supplied with the oil from the feed unit 11 via a feed pipe 12 and cools or heats respective portions of a machine tool where these heat exchanging units are arranged. The apparatus 10 also has an oil discharging portion 14 which is connected to the heat exchanging unit 13d positioned at the most downstream side of the heat exchanging portion 13. The oil discharging portion 14 recovers the oil passed through the heat exchanging portion 13 and feeds it back to the feed unit 11. A flow control valve 15 is provided between the oil discharging portion 14 and the feed unit 11, which controls the flow rate of the oil passing through the heat exchanging portion 13.

The feed unit 11 is provided therein with an oil coolant device 18 which has an oil reservoir 181, a filter 182 and a coolant pump 183. The coolant pump 183 is supplied with the oil from the reservoir 181 via the filter 182, and cools it with fluorine gas, thereafter pumps out the cooled oil to the heat exchanging portion 13. Instead of the coolant pump 183, a cooling device and a feed pump may be provided separately.

The feed unit 11 is also provided therein with a heater 19 for heating the oil. Where the heated oil is fed to the heat exchanging portion 13, the coolant pump 183 is driven so that it functions only as a feed pump and at the same time the heater is driven to heat the oil. A feed pump for feeding the heated oil may be provided independently.

The coolant pump 183 and the heater 19 are controlled by a control unit 184 provided in the feed unit 11. In the present example, under the control of the control unit 184, the oil is fed to the heat exchanging portion 13 without being cooled where the oil temperature is detected by an appropriate means such as a bimetal thermometer that it is lower than a prescribed value such as the atmospheric temperature. While, where the oil temperature is detected that it is high above a prescribed temperature, the oil is fed to the heat exchanging portion 13 without heated.

In addition, the feed unit 11 is provided with a level meter or a float switch (not shown) for monitoring the amount of oil stored in the reservoir 181. The coolant pump 183 has a bypass type cleaner (not shown).

The oil reservoir 181 of the feed unit 11 has an oil recovery port 111 which is connected via the flow control valve 15 to an oil discharging port 141 of an oil discharging pipe 142 constituting the oil discharging portion 14. With the flow control valve 15 provided, the flow rate of the oil circulating through the heat exchanging portion 13 can be adjusted.

Next, the constitution of the heat exchanging portion 13 will be described. In the present example, the heat exchanging portion 13 has four heat exchanging units 13a, 13b, 13c and 13d of the same size and structure. These heat exchanging units are bag-shaped and made of low stretchable, flexible material so that they are expandable or shrinkable in accordance with the flow rate of the oil passing therethrough. In FIG. 1, the respective heat exchanging units are shown in an expanded state, wherein the respective units are fusiformed generally. The heat exchanging units may be made in any other appropriate form so long as they are expandable and shrinkable in accordance with the flow rate of the oil passing therethrough.

In the present example, the heat exchanging units 13a to 13d are connected in serial. That is, the first heat exchanging unit 13a is connected at its outlet port via a feed pipe 131 to an inlet port of the adjacent second heat exchanging unit 13b, which, in turn, is connected at its outlet port via a feed pipe 132 to an inlet port of the third heat exchanging unit 13c. Likewise, an outlet port of the third heat exchanging unit 13c is connected via a feed pipe 133 to an inlet port of the fourth heat exchanging unit 13d. An inlet port of the first heat exchanging unit 13a is connected via the feed pile 12 to the feed unit 11, while an outlet port of the fourth heat exchanging unit 13d is connected via the discharging pipe 142 to the feed unit side. The pipes 131 to 133, 12, and 142 are flexible and are easily arranged in and around a machine tool.

The flexible feed pipes 131 to 133 are releasably connected to the respective heat exchanging units 13a to 13d. For example, the second heat exchanging unit 13b is provided at its inlet and outlet ports with pipe joints 15, 15. The pipe joint 16 has a collar and retaining projection extending inwardly from the collar. By inserting the pipe in the collar of the joint 16, the retaining projection engages with the outer circumferential surface of the pipe to form an automatic connection between the joint and the pipe. The pipe can be automatically removed from the joint 16 by pushing the collar of the joint inwardly so that the projection move to a non-engaging position with the pipe. In the present example, the pipes 12 and 142 are also releasably connected to the heat exchanging units 13a and 13d, respectively. The joint 16 may be of any other suitable conventional structure so long as it forms releasable connection.

Figure 2:
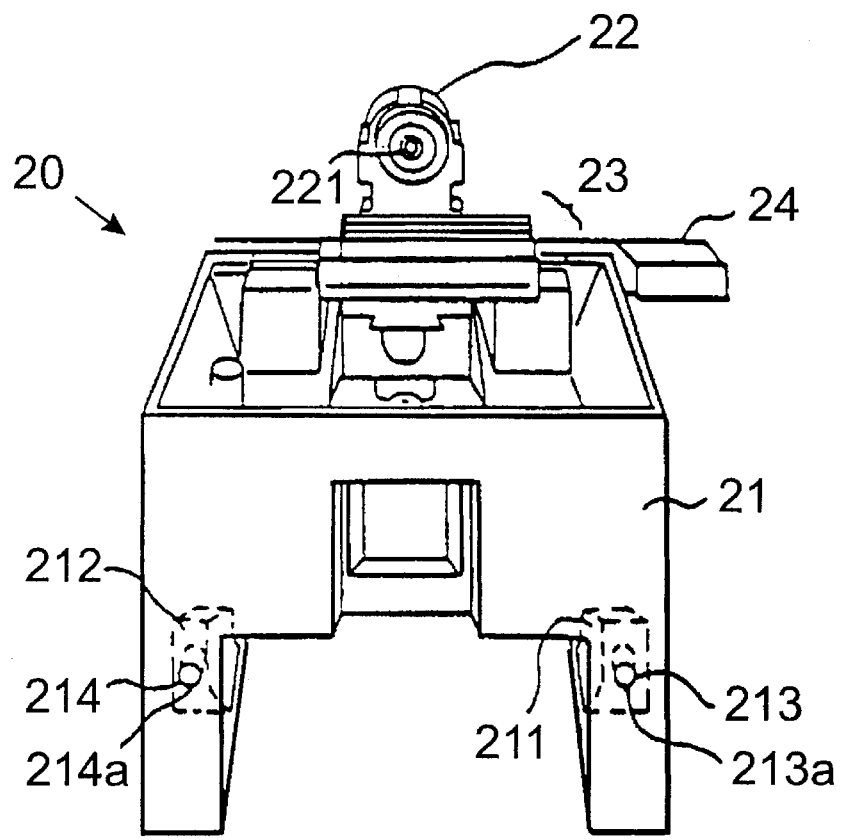
FIG. 2 is a front perspective view of a machine tool which is designed to be provided with the apparatus of FIG. 1.
Figure 3:
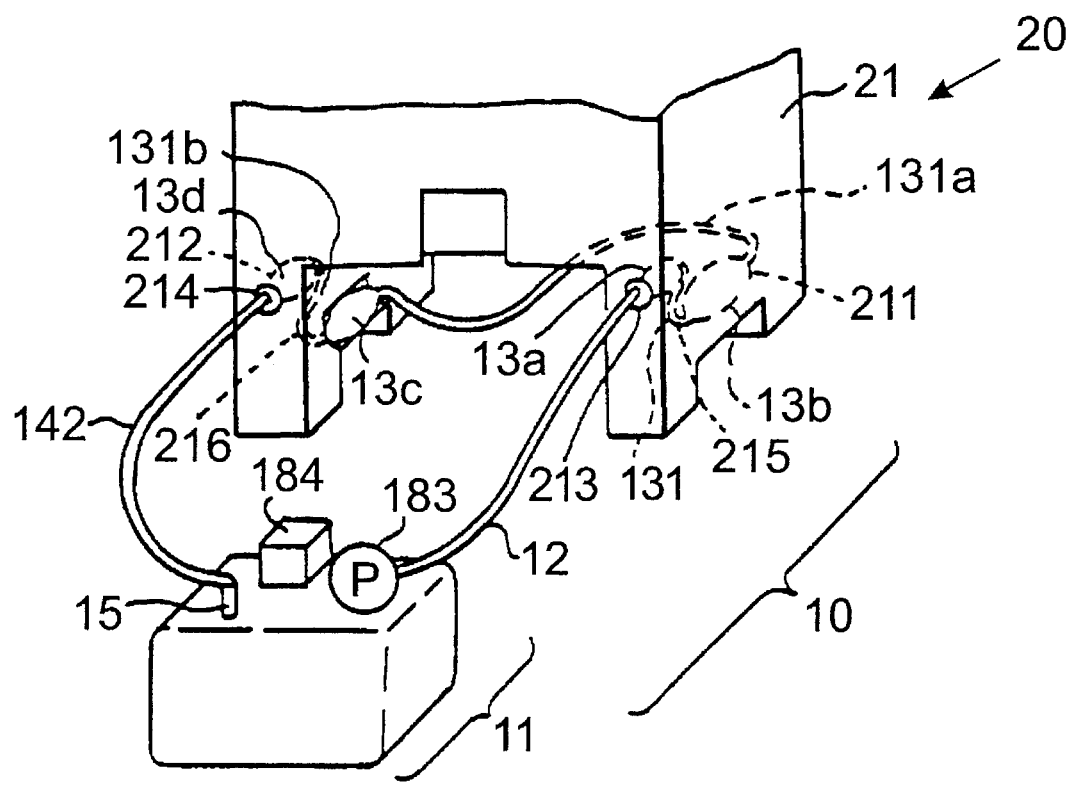
FIG. 3 is a partial perspective view of the front side of the machine tool of FIG. 2 in a condition that the apparatus of FIG. 1 is provided.

FIGS. 2 and 3 show a machine tool, to which the apparatus 10 of the present example can be provided. A machine tool 20 has a base 21 made of cast iron, on which a headstock 22 and a slide table unit 23 are mounted. A feed motor 24 is provided at the side of the slide table unit 23 for driving the table 23 to slide. At the rear side of the headstock 22 and the table unit 23, a driving motor for a spindle 221 of the headstock 22 and the like are mounted.

The electrical power supplied to the machine tool 20 is partially consumed in the form of thermal energy, so that the machine tool is heated and suffered from thermal deformation. The thermal deformation occurred in the machine tool adversely affects the machining accuracy thereof or the like. In order to suppress the heat deformation of the machine tool, it has been proposed to design the base so as to exhibit a heat symmetry, or to provide an oil jacket around the bearing mechanism of the spindle to remove the heat generated therefrom. However, even if these conventional methods are adopted, it cannot always be expected to suppress the heat deformation of the machine tool satisfactory, since the places for providing the oil jackets in the machine tool are sometimes limited. Whereas, the heat deformation of the machine tool 20 can effectively be suppressed by the provision of the apparatus 10 of the present example.

Among the respective portions of the machine tool 20, the headstock 22 having the spindle rotating at a high speed is one that generates the largest amount of heat. If the heat symmetry of the base 21 is deteriorated by the heat generated from the headstock 22, the heat deformation occurs in the machine tool 20. In order to prevent or suppress such a heat deformation of the machine tool 20, the apparatus 10 is, for example, provided to the machine tool 20 so as to heat the low temperature side of the base 21. In the following, the oil having a temperature maintained at around 40 degrees of Centigrade is circulated through the heat exchanging portion 13 to heat the low temperature side of the machine tool 20.

In the present example, the machine tool 20 is designed to accommodate four heat exchanging units 13a to 13d. For this purpose, the machine tool 20 has the base 21 provided therein with two recessed portions 211, 212 and two void portions 213, 214. The recessed portions 211 and 212 are formed on the inner sides of leg portions of the base 21. The recessed portions 211, 212 and the void portions 213, 214 can by formed by any one of conventional appropriate methods. As can be seen from FIG. 3, the void portions 213 and 214 have openings 213a and 214a, respectively, exposing from the front surface of the base 21. The void portion 213 is linked via a passage 215 formed in the base 21 to the recessed portion 211. Likewise, the other void portion 214 is linked via a passage 216 formed in the base 21 to the recessed portion 212. Although the machine too 20 has four places for receiving the heat exchanging units 13a to 13d, the number of places for receiving the heat exchanging units can be varied according to the number of portions of machine tool to be heated or cooled.

The heat exchanging units 13a to 13d are arranged in the respective portions 211 to 214 as follows. First, the respective heat exchanging units 13a to 13d are disassembled from the feed unit 11 by removing the feed pipes 12, 131 to 133 and the discharging pipe 142. Then, the first and fourth heat exchanging units 13a and 13d are inserted into the void portions 213 and 214, respectively, through the openings 213a and 214a. Since these void portions 213 and 214 are small in size compared to these heat exchanging units 13a and 13d in the expanded state shown in FIG. 1, these heat exchanging units 13a and 13d are shrank by a certain degree by discharging oil or air contained therein so as to be able to insert into the respective void portions 213 and 214. When inserting into the void portion 213, the heat exchanging unit 13a is connected with the feed pipe 131 beforehand and is inserted into the void portion 213 from the side of the connected feed pipe 131. Thus, the heat exchanging unit 13a and the feed pipe 131 are arranged in the void portion 213 and the passage 215, respectively. Insertion of the heat exchanging unit 13d and the feed pipe 133 is carried out in the same manner as that of the heat exchanging unit 13a and the feed pipe 131.

Then, the second and third heat exchanging units 13b and 13c are inserted into the corresponding recessed portions 211 and 212, and thereafter they are connected with each other by the feed pipe 133. In addition, the heat exchanging units 13b and 13c are connected to the feed pipes 131 and 133 formerly arranged in the base 21. Finally, the first and fourth heat exchanging units 13a and 13d are connected with the feed pipe 12 and the discharging pipe 142, respectively. As a result, the apparatus 10 of FIG. 1 where the four heat exchanging units 13a to 13d are connected in serial is arranged in the machine tool 20.

In operation, the heated oil is supplied from the feed unit 11 and circulated through the four heat exchanging units 13a to 13d. Since the flow rate of the oil circulating through the heat exchanging units 13a to 13d is controlled by the control valve 15 inserted between the discharging pipe 142 and the feed unit 11, the respective heat exchanging units 13a to 13d are maintained in an expanded state, so that the outer surfaces of the respective units are set fixedly contacted with the inner surfaces of the portions 211 to 214 of the machine tool 20 where these units are accommodated. Therefore, in each of the heat exchanging units 13a to 13d, heat exchanging operation is effectively carried out between the oil supplied thereto and the portion of the machine tool. Thus, even if the portion of the machine tool 20 where the headstock 22 is mounted is heated during the operation thereof, the heat symmetry of the base 21 is maintained since the low temperature side of the base 21 is heated by the heat exchanging units 13a to 13d.

It has been found that, according to experiments conducted by the inventor of the present invention, the heat deformation of the machine tool 20 can be suppressed to at least 25% of that occurred in the machine tool without the apparatus of the present example and that the machining accuracy thereof can be maintained.

In the present example, the machine tool 20 is heated by the heat exchanging units 13a to 13d. Alternatively, the machine tool 20 may be cooled by the heat exchanging units arranged in portions of high temperature side of the machine tool so that the machine tool is prevented from heat deforming. In this case, the heat exchanging units 13a to 13d are supplied with oil cooled by the oil coolant pump 183.

As described above, since the machine tool 20 of the present example is heated at its low temperature side by the heat exchanging units 13a to 13d provided therein, the heat deformation thereof can be suppressed without provision of a cooling oil jacket or with a minimum provision of such a cooling oil jacket. In addition, the oil circulating through the heat exchanging units 13a to 13d does not directly contact with the respective portions of the machine tool 20, so that it does not cause to rust these portions of the machine tool. Further, even if the heat distribution of the machine tool 20 is varied due to the change in atmosphere thereof or the like, the positions of the heat exchanging units 13a to 13d arranged in the machine tool can easily be changed accordingly, whereby the heat symmetry of the machine tool can be maintained irrespective of the change in atmosphere of the machine tool. Furthermore, according to the present example, the feed unit 11 of the apparatus 10 has cooling and heating means for oil, so that cooling and/or heating of the machine tool can be carried out selectively.

Since the heat exchanging units 13a to 13d of the apparatus 10 are in the from of bag made of stretchable material and is capable of being expanded or shrunk, they can easily be inserted into prescribed narrow portions of the machine tool in a shrunk state. Further, these heat exchanging units are maintained in an expanded state in operation, so that they are fixedly contacted with the portions of the machine tool. Therefore, the machine tool can effectively be cooled or heated by the heat exchanging units.

In addition, since the heat exchanging units 13a to 13d and the corresponding feed pipes are releasably connected with each other by means of the pipe joints 16, it is easy to connect a desired number of heat exchanging units and assemble in the machine tool. Further, according to the present example, the oil is circulated between the feed unit 11 and the heat exchanging units 13a to 13d, and therefore a limited amount of oil can be used effectively.

In the present example, the flow control valve 15 is provided to control the flow rate of the oil circulating through the heat exchanging units 13a to 13d. Alternatively, the flow rate of the oil can be adjusted, for example, by controlling the feed rate of oil from the coolant pump 183 in accordance with the discharging rate of oil from the discharging portion 14. The heat exchanging units can be connected in serial or in parallel. The connecting mode of the heat exchanging units, the number thereof and the like depend on the size or structure of the machine tool to which the heat exchanging units are assembled, and so they are not limited to those of the present example. In addition, although the heat exchanging units are arranged in the base of the machine tool according to the present example, they may be arranged other than these portions of the machine tool. They may be arranged, for example, in the surroundings of the headstock 22, openings in the sliding table 23 and the like. The positions of the heat exchanging units are assembled are determined in accordance with the thermal distribution of the machine tool, which are not limited to the present example so long as the thermal deformation of the machine tool can be suppressed effectively.

In addition, according to the present example, the oil fed to the heat exchanging units is cooled by utilizing the coolant pump 183. A means for cooling oil is not limited to the coolant pump, but may be any other suitable means. The heater 19 may be replaced by any other suitable means. Further, either one of cooling means or heating means may be eliminated from the feed unit 11.

Furthermore, according to the present example, the control of cooling and heating the oil in the feed unit 11 is carried out based on the ambient temperature. Instead, this can be carried out by detecting continuously or intermittently the temperatures of the respective portions of the machine tool to be cooled or heated and controlling the temperature of oil based on the detected temperatures.

Second Example

Figure 4:
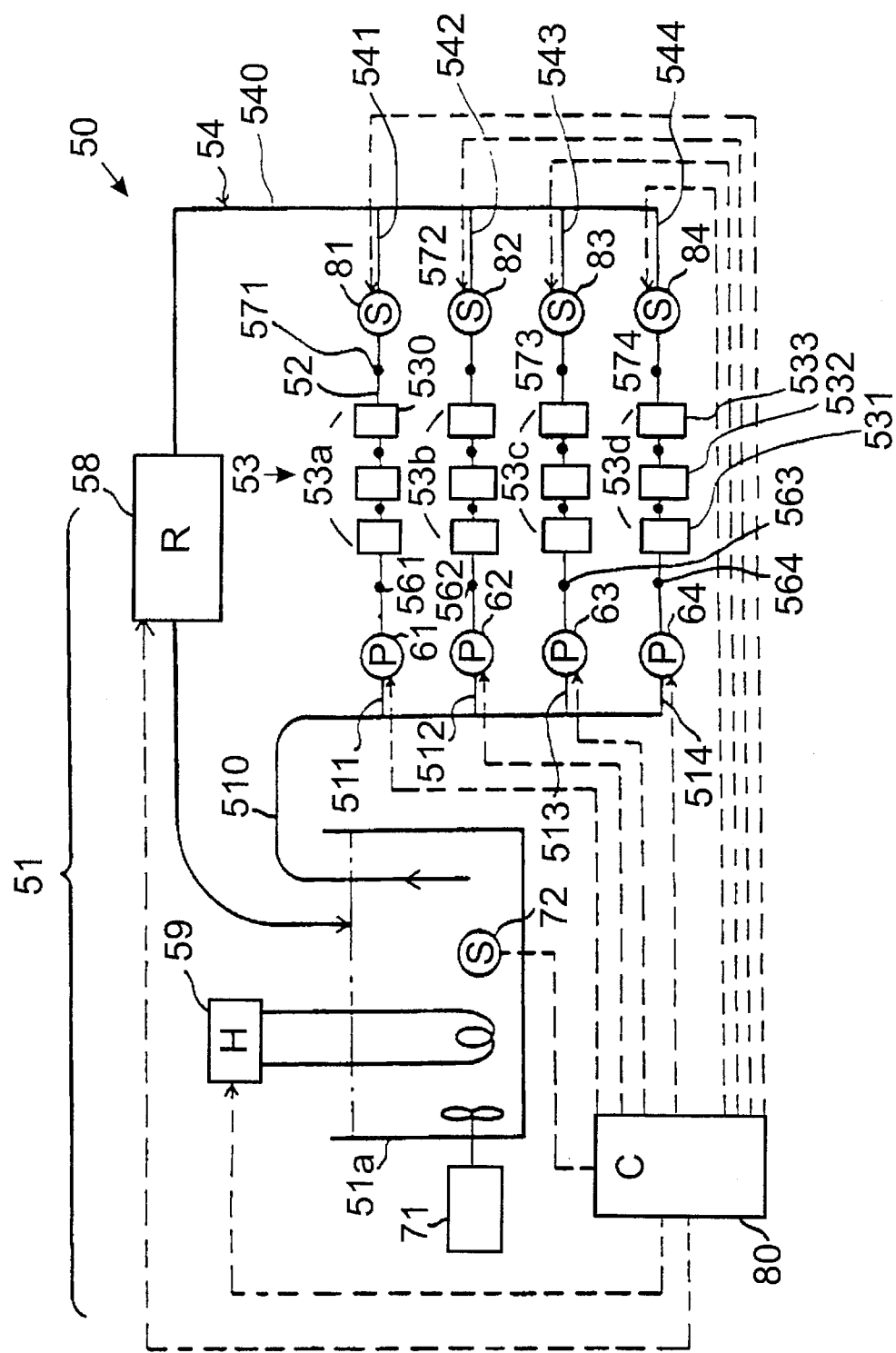
FIG. 4 is a block diagram of a second example of the apparatus according to the present invention.

FIG. 4 is a schematic diagram of an apparatus for preventing heat deformation of a machine tool according to the second example of the present invention. The apparatus 50 comprises a feed unit 51 which has a water reservoir 51a, a heater 59 for heating water stored in the reservoir 51a, a stirring machine 71 for stirring water in the reservoir 51a and a sensor 72 for detecting a temperature of water in the reservoir 51a. An outlet port of the reservoir 51a is connected via a feed pipe 510 and four branch pipes 511 to 514 therefrom to the suction ports of feed pumps 61 to 64. The respective pumps 61 to 64 are connected at their discharging ports with feed pipes 521 to 524, which in turn are releasably connected to a heat exchanging portion 53 by means of pipe joints 561 to 564.

The heat exchanging portion 53 comprises four heat exchanging units 53a to 53d of the same structure. Each of the heat exchanging units 53a to 53d includes three heat exchanging bags 531 to 533. The respective heat exchanging units 53a to 53d are releasably connected at their exit sides with branch pipes 541 to 544 by means of pipe joints 571 to 574, respectively. These branch pipes 541 to 544 are connected to a discharging pipe 542 constituting the discharging portion 54. The branch pipes 541 to 544 are provided with sensors 81 to 84 for detecting the temperatures of water discharging from the respective heat exchanging units 53a to 53d. The discharging pipe 540 is connected via a radiator 58 to the reservoir 51a of the feed unit 51. The radiator 58 of the present example can be adjusted of its cooling capability by controlling the rotational speed of a motor fan thereof.

As can be seen from FIG. 4, the heat exchanging units 53a to 53d are connected in parallel between the feed unit 51 and the discharging portion 54. Each of the heat exchanging units 53a to 53d includes three heat exchanging bags 531 to 533 connected in serial having the same structure as those of the heat exchanging units 13a to 13d of the first example as described above. More specifically, each of the bags 531 to 533 is formed by a flexible sheet material made of resin, rubber or the like, and is capable of being expanded or shrunk in accordance with the amount of water passing therethrough. The bags 531 to 533 constituting each of the heat exchanging unit 53a to 53d are releasably connected by means of pipe joints having the same structure as those of the pipe joints 561 to 564. Instead of providing a plurality of heat exchanging bags, one or more of the heat exchanging units 53a to 53d may be comprised by a single heat exchanging bag.

The feed unit 51 is also provided with a control unit 80 which monitors the change in temperature of water between flowing into and discharging from the heat exchanging portion 53 based on the outputs of the respective sensors 72 and 81 to 84. In addition, the control unit 80 controls the respective pumps 61 to 64 to adjust the feed rate of water to the heat exchanging portion 54, and also controls the heater 59 and radiator 58.

Figure 5:
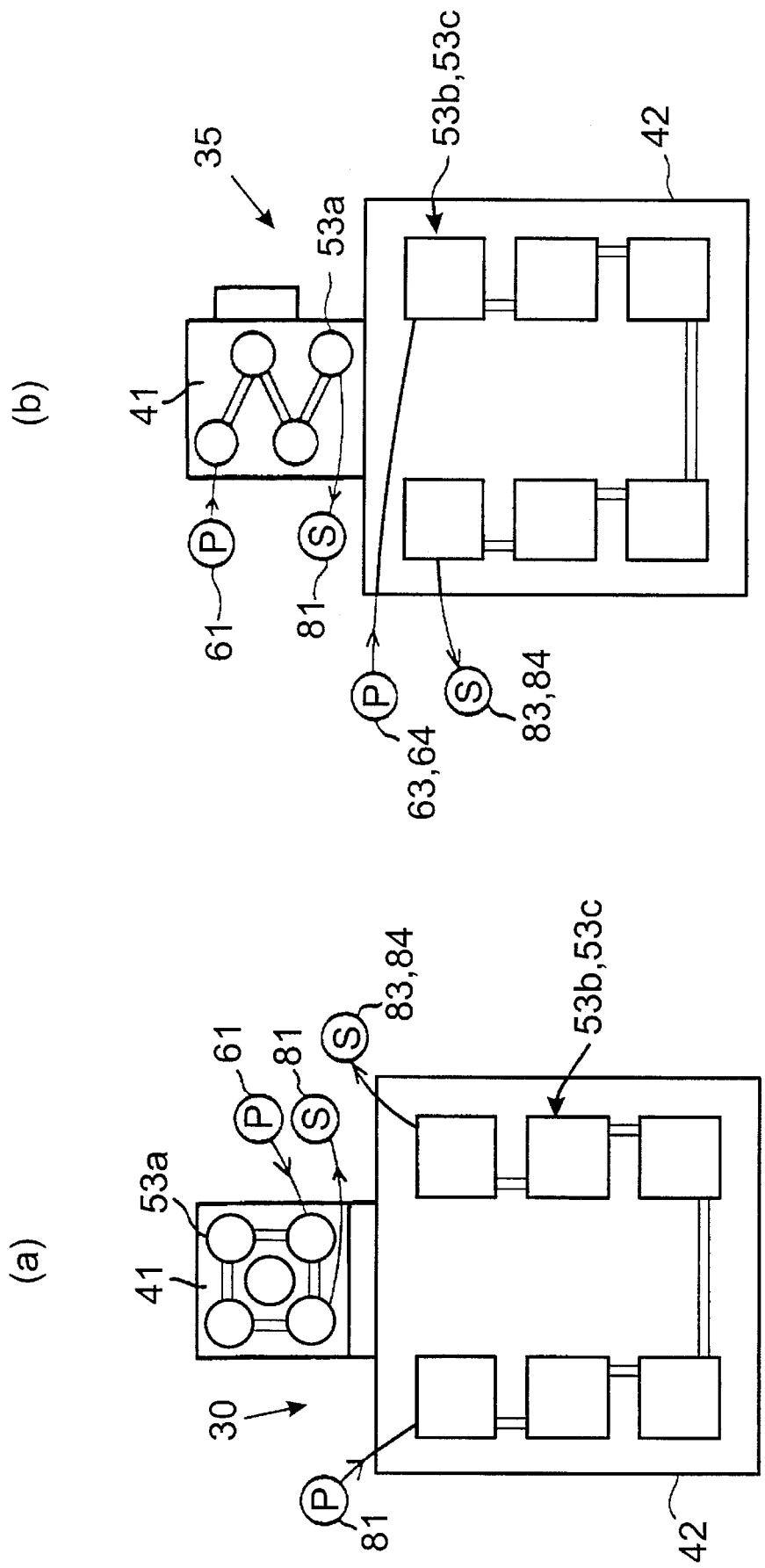
FIGS. 5(a) and 5(b) illustrate examples of arrangement of the apparatus of FIG. 4, respectively.
Figure 6:
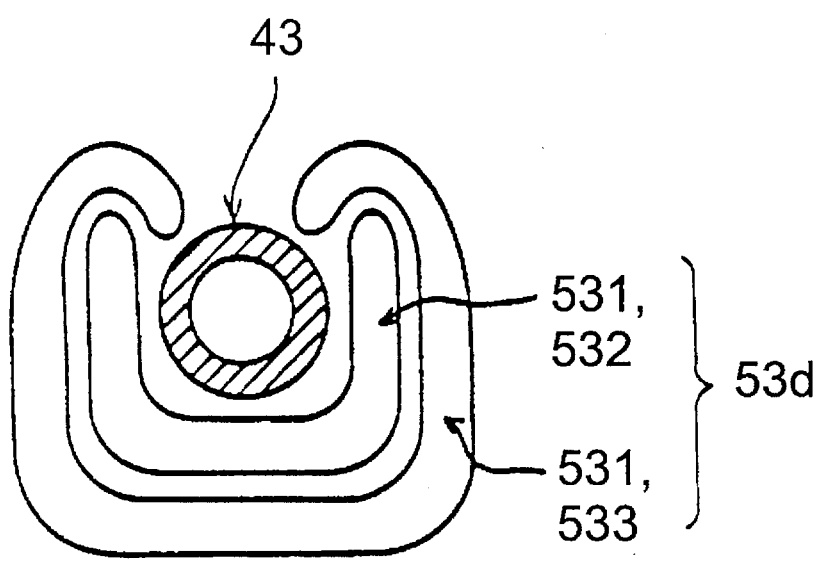
FIG. 6 illustrates an example of arrangement of the apparatus of FIG. 4, wherein a heat exchanging means of the apparatus is placed around the spindle of a machine tool.

FIGS. 5(a) and 5(b) illustrate the apparatus 50 of the present example being arranged in a lathe 30 and a milling machine 35, respectively. In both cases, among the heat exchanging units 53a to 53d, the first heat exchanging unit 53a is arranged in respective body portions 41 of the lathe 30 and the milling machine 35, and the second and third heat exchanging units 53b and 53c are arranged in respective bases 42 thereof. The remaining heat exchanging unit 53d is arranged around respective spindle portions 43 as shown in FIG. 6, wherein since excessive heat generation occurs in the spindle portion 43, two or more heat exchanging bags 531 to 533 constituting the heat exchanging unit 53d are wound around the spindle portion 43 in an overlapped condition so as to prevent heat generated from the spindle portion 43 from transferring to the surrounding portions thereof. Other than the spindle portion 43, it is preferable to wind the heat exchanging bags in an overlapped condition around those portions as the surroundings of the motor, the recovery portion of cutting oil, the surroundings of the hydraulic tank and the like generating an excessive amount of heat.

After assembling the apparatus 50 of the present example to the lathe or the milling machine as shown in FIGS. 5(a), 5(b) and 6, the respective heat exchanging units 53a to 53d are supplied with water of prescribed temperature as a heat transfer fluid from the feed unit 51, whereby the spindle portion 43, the body portion 41 and the base 42 are cooled or heated by the water passing through the corresponding heat exchanging units so that the temperatures of these portions are equalized. More specifically, the surroundings of the spindle 43 is cooled by the heat exchanging unit 53d as it generates an excessive amount of heat, while the base 42 is heated by water passing through the heat exchanging units 53b and 53c as it does not generate heat. Accordingly, the respective portions of the machine tool is equalized in temperature and therefore the thermal deformation of the machine tool can be suppressed.

According to the present example, the temperature of water is detected when flowing into and discharging from the respective heat exchanging units 53a to 53d by means of sensors 81 to 84. Based on the outputs of the sensors, the controller 80 calculates the heat capacity of water and controls the radiator 58 and the heater 59 so that the temperature of water circulating through the heat exchanging units is maintained to be constant. That is, where the water absorbs a certain amount of heat from the machine tool that is larger than that of heat discharged from the water to the machine tool, an amount of heat corresponding to the difference therebetween must be discharged from the water through the radiator 58. The amount of heat which must be discharged can be determined as the enthalpy change measured from the change in temperature of water between flowing into and discharging from each of the heat exchanging units and the specific heat of water. Hence, the total amount of heat which must be discharged from water through the radiator can be calculated as the sum of enthalpy change in each of the heat exchanging units. Based on the calculated value, the controller 80 controls to drive the radiator 58 so as to maintain the temperature of water to be constant. On the other hand, if the amount of heat discharging from the water is larger, an amount of heat corresponding to the difference therebetween is applied to the water to thereby maintain the temperature of water to be constant.

As described above, according to the apparatus 50 of the present example, such effects as those of the first example of the present invention can be obtained, that is, the heat deformation of the machine tool can be suppressed without providing cooling oil jacket therein, the heat exchanging units are arranged in narrow spaces in the machine tool since they can be shrunk, and the like. In addition, since the controller 80 monitors an amount of heat discharged from or absorbed into the water based on the outputs of the sensors 81 to 84, and 72, and controls to heat or cool the water, so that the temperature of the water can be maintained to be constant. According to the survey of the inventor of the present invention, the machining accuracy of the machine tool which is provided with the apparatus 50 of the present example was found to be enhanced to be six times as high as that obtained without providing the apparatus 50.

As mentioned above, the apparatus for preventing heat deformation of a machine tool according to the present invention is characterized in that the heat exchanging portion for controlling the temperature of the desired portions of the machine tool is capable of being expanded or shrunk. Therefore, according to the present invention, since desired portions of the machine tool can be cooled or heated easily and effectively, the deformation of the machine tool can be suppressed without the provision of conventional cooing oil jackets or with a minimum provision thereof. In addition, the heat transfer fluid such as oil, water or the like does not directly contact the respective portions of the machine tool, so that the machine tool is prevented from rusting by the fluid. Further, even if the thermal distribution of the machine tool is changed due to the change in atmosphere where the machine tool is placed, the position of the heat exchanging portion attached to the machine tool can easily be modified in order to compensate the change in the thermal distribution. Furthermore, since the heat exchanging portion can be expanded or shrunk, it can easily be arranged even in a narrow space of the machine tool, and thus the limitation to places where the heat exchanging portions are provided can be minimized. In addition, the heat exchanging portion is arranged in a fixedly contacted state to the machine tool, so that an effective heating or cooling can be carried out.

On the other hand, according to the present invention, a plurality of heat exchanging portions are releasably connected in serial or in parallel by means of the pipe joints. Therefore, a plurality of portions of the machine tool can be cooled or heated by the apparatus of the present invention. In addition, the change of portions to be cooled or heated can easily be carried out.

Further, where the discharging portion is connected to the feed unit to circulate the heat transfer fluid through the feed unit and the heat exchanging portion, a small amount of heat transfer fluid can be used economically.

I claim:

1. An apparatus for preventing heat deformation of a machine tool comprising a feed means which has a heating means of a heat transfer fluid and a pumping out means for pumping out said heat transfer fluid heated by said heating means, a heat exchanging means which is supplied with said heat transfer fluid from said feed means via a piping means and heats a portion of said machine tool where said heat exchanging means is to be arranged, a discharging means for discharging said heat transfer fluid passed through said heat exchanging means, and a flow control means for controlling a flow rate of said heat transfer fluid passing through said heat exchanging means, wherein said heat exchanging means has at least one heat exchanging unit which is made entirely of a flexible material so that it is capable of being expanded and shrunk in accordance with an amount of said heat transfer fluid therein.

2. An apparatus for preventing heat deformation of a machine tool according to claim 1, wherein said heat exchanging means has at least one heat exchanging unit which is bag-shaped so that it is capable of being expanded and shrunk in accordance with said heat transfer fluid therein.

3. An apparatus for preventing heat deformation of a machine tool according to claim 2, wherein said heat exchanging means is releasably connected between said feed means and said discharging means by means of joint means.

4. An apparatus for preventing heat deformation of a machine tool according to claim 3, wherein said heat exchanging means has a plurality of said heat exchanging units connected serially and releasably by means of joint means, said heat exchanging units being intended to be arranged in different portions of said machine tool.

5. An apparatus for preventing heat deformation of a machine tool according to claim 3, wherein said heat exchanging means has a plurality of said heat exchanging units connected in parallel between said feed means and said discharging means, said heat exchanging units being intended to be arranged in different portions of said machine tool.

6. An apparatus for preventing heat deformation of a machine tool according to claim 1, wherein said discharging means is connected to said feed means so that said heat transfer fluid passed through said heat exchanging means is fed back to said feed means.

7. An apparatus for preventing heat deformation of a machine tool according to claim 6, further comprising a control means which detects a temperature of said heat transfer fluid when flowing into and discharging from said heat exchanging means and controls said heating means to heat said heat transfer fluid based on detected temperature of said heat transfer fluid.

8. An apparatus for preventing heat deformation of a machine tool according to claim 7, wherein said feed means has a cooling means for cooling said heat transfer fluid and wherein said control means controls to drive said heating means and said cooling means selectively based on said detected temperature of said heat transfer fluid.

9. An apparatus for preventing heat deformation of a machine tool comprising a feed means which has a cooling means for cooling a heat transfer fluid and a pumping out means for pumping out said heat transfer fluid cooled by said cooling means, a heat exchanging means which is supplied with said heat transfer fluid from said feed means via a piping means and cools a portion of said machine tool where said heat exchanging means is to be arranged, a discharging means for discharging said heat transfer fluid passed through said heat exchanging means, and a flow control means for controlling a flow rate of said heat transfer fluid passing through said heat exchanging means, wherein said heat exchanging means has at least one heat exchanging unit which is made entirely of a flexible material so that it is capable of being expanded and shrunk in accordance with an amount of said heat transfer fluid therein.

10. An apparatus for preventing heat deformation of a machine tool according to claim 9, wherein said heat exchanging means has at least one heat exchanging unit which is bag-shaped so that it is capable of being expanded and shrunk in accordance with said heat transfer fluid therein.

11. An apparatus for preventing heat deformation of a machine tool according to claim 10, wherein said heat exchanging means is releasably connected between said feed means and said discharging means by means of joint means.

12. An apparatus for preventing heat deformation of a machine tool according to claim 11, wherein said heat exchanging means has a plurality of said heat exchanging units connected serially and releasably by means of joint means, said heat exchanging units being intended to be arranged in different portions of said machine tool.

13. An apparatus for preventing heat deformation of a machine tool according to claim 11, wherein said heat exchanging means has a plurality of said heat exchanging units connected in parallel between said feed means and said discharging means, said heat exchanging units being intended to be arranged in different portions of said machine tool.

14. An apparatus for preventing heat deformation of a machine tool according to claim 9, wherein said discharging means is connected to said feed means so that said heat transfer fluid passed through said heat exchanging means is fed back to said feed means.

15. An apparatus for preventing heat deformation of a machine tool according to claim 14, further comprising a control means which detects a temperature of said heat transfer fluid when flowing into and discharging from said heat exchanging means and controls said cooling means to cool said heat transfer fluid based on detected temperature of said heat transfer fluid.

16. A machine tool having an apparatus for preventing heat deformation of said machine tool characterized in that:

said apparatus for preventing heat deformation of a machine tool comprises a feed means which has a heating means of a heat transfer fluid and a pumping out means for pumping out said heat transfer fluid heated by said heating means, a heat exchanging means which is supplied with said heat transfer fluid from said feed means via a piping means, a discharging means for discharging said heat transfer fluid passed through said heat exchanging means, and a flow control means for controlling a flow rate of said heat transfer fluid passing through said heat exchanging means, wherein said heat exchanging means has at least one heat exchanging unit which is made entirely of a flexible material so that it is capable of being expanded and shrunk in accordance with an amount of said heat transfer fluid therein, and that, said machine tool has at least one portion in which said heat exchanging means is accommodated, whereby said portion is heated by said heat exchanging means so as to equalize thermal distribution of said machine tool and suppress thermal deformation thereof.

17. A machine tool according to claim 16, wherein said heat exchanging means has at least one heat exchanging unit which is bag-shaped that it is capable of being expanded and shrunk in accordance with said heat transfer fluid therein.

18. A machine tool according to claim 17, wherein said heat exchanging means is releasably connected between said feed means and said discharging means by means of joint means.

19. A machine tool according to claim 18, wherein said heat exchanging means has a plurality of said heat exchanging units connected serially and releasably by means of joint means, and wherein said machine tool has a plurality of said portions in which said heat exchanging units are accommodated.

20. A machine tool according to claim 18, wherein said heat exchanging means has a plurality of said heat exchanging units connected in parallel between said feed means and said discharging means, and wherein said machine tool has a plurality of said portions in which said heat exchanging units are accommodated.

21. A machine tool according to claim 16, wherein said discharging means is connected to said feed means so that said heat transfer fluid passed through said heat exchanging means is fed back to said feed means.

22. A machine tool according to claim 21, further comprising a control means which detects a temperature of said heat transfer fluid when flowing into and discharging out said heat exchanging means and controls said heating means to heat said heat transfer fluid based on detected temperature of said heat transfer fluid.

23. A machine tool according to claim 22, wherein said feed means has a cooling means for cooling said heat transfer fluid and where in said control means controls to drive said heating means and said cooling means selectively based on said detected temperature of said heat transfer fluid.

24. A machine tool having an apparatus for preventing heat deformation of said machine tool characterized in that:

said apparatus for preventing heat deformation of a machine tool comprises a feed means which has a cooling means for cooling a heat transfer fluid and a pumping out means for pumping out said heat transfer fluid cooled by said cooling means, a heat exchanging means which is supplied with said heat transfer fluid from said feed means via a piping means, a discharging means for discharging said heat transfer fluid passed through said heat exchanging means, and a flow control means for controlling a flow rate of said heat transfer fluid passing through said heat exchanging means, wherein said heat exchanging means has at least one heat exchanging unit which is made entirely of a flexible material so that it is capable of being expanded and shrunk in accordance with an amount of said heat fluid therein, and that, said machine tool has at least one portion in which said heat exchanging means is accommodated, whereby said portion is cooled by said heat exchanging means so as to equalize thermal distribution of said machine tool and suppress thermal deformation thereof.

25. A machine tool according to claim 24, wherein said heat exchanging means has at least one heat exchanging unit which is bag-shaped so that it is capable of being expanded and shrunk in accordance with said heat transfer fluid therein.

26. A machine tool according to claim 25, wherein said heat exchanging means is releasably connected between said feed means and said discharging means by means of joint means.

27. A machine tool according to claim 26, wherein said heat exchanging means has a plurality of said heat exchanging units connected serially and releasably by means of joint means, and wherein said machine tool has a plurality of said portions in which said heat exchanging units are accommodated.

28. A machine tool according to claim 26, wherein said heat exchanging means has a plurality of said heat exchanging units connected in parallel between said feed means and said discharging means, and wherein said machine tool has a plurality of said portions in which said heat exchanging units are accommodated.

29. A machine tool according to claim 24, wherein said discharging means is connected to said feed means so that said heat transfer fluid passed through said heat exchanging means is fed back to said feed means.

30. A machine tool according to claim 29, further comprising a control means which detects a temperature of said heat transfer fluid when flowing into and discharging out said heat exchanging means and controls said cooling means to cool said heat transfer fluid based on detected temperature of said heat transfer fluid.

* * * * *